Patented June 5, 1934

1,961,737

UNITED STATES PATENT OFFICE

1,961,737

PROCESS OF FORMING ACETIC ACID FROM METHANOL AND CARBON MONOXIDE

Joseph C. Carlin, Nashville, Tenn., and Norman W. Krase, Urbana, Ill., assignors to Tennessee Products Corporation, Nashville, Tenn., a corporation of Tennessee No Drawing. Application March 21, 1930, Serial No. 437,930

7 Claims. (Cl. 260—116)

This invention relates to methods and means for the formation and manufacture of acetic acid.

One of the principal objects is to enable acetic acid to be formed from methyl alcohol, water vapor, and carbon monoxide.

Another object of the invention is to provide a process for converting aliphatic alcohol to the next higher acid in the same chemical series.

Another object of the invention pertains to a process for converting an alcohol to the next higher acid in the same chemical series by the use of heat and pressure.

Another object of the invention relates to a process for converting an alcohol to the next higher acid in the same chemical series by the application of heat and pressure in the presence of a selected catalyst.

Another object of the invention is to improve, simplify and render more efficient and economical the conversion of an alcohol to the next higher acid in the same chemical series by causing any unreacted gases or vapors coming from the catalyst to be returned or recirculated through the catalyst, without interrupting the circulation and without release of the pressure, thereby effecting a more complete conversion of the alcohol to the acid.

Other objects and advantages other than those hereinbefore mentioned will be specifically pointed out and will be apparent from the discussion and description herein given.

This invention resides specifically in the combination, sequential operation, and relative application of steps or parts of steps, as will be fully indicated hereinafter.

Heretofore it has been shown that alcoholates, such as sodium ethylate can be caused by proper treatment to combine with carbon monoxide to yield a product which is a salt of the next higher acid in the same chemical series from which the original alcoholate is derived (e. g. sodium propionate). The present invention, together with the invention disclosed in our copending application for Letters Patent Serial No. 379,312, filed July 18, 1929, enables the same result to be attained by a novel and simplified process. It has been found that methyl alcohol, for example, under certain conditions will react with carbon monoxide to form acetic acid without producing during such formation either an alcoholate or a salt of the acid so formed. By following the process according to the present invention, therefore, it is possible to make commercial as well as pure acetic acid on a large scale and at greatly reduced costs.

In our copending application for Letters Patent aforementioned we disclose an illustration of one manner of carrying out the process which we will briefly repeat here so that the same may be contrasted with the subject matter of this present invention. We there said that methyl alcohol vapor and carbon monoxide gas are mixed and compressed under a high pressure, which pressure is usually about 250 atmospheres, although pressures ranging from 50 to 400 atmospheres, can be successfully used without departing from the scope of the invention. This subjection of the mixture to pressure is said to be preferably effected at a temperature sufficiently high to prevent condensation of the alcohol vapor. The compressed mixture is then passed at a selected velocity over a heated catalyst. As the gaseous mixture comes out of the catalyst tube it is passed through a condenser, or is subjected to other means for causing condensation of the acetic acid vapor formed. Thereafter, the condensed vapor and gas are passed through a suitable device, trap or separator, to separate the condensed acetic acid from the uncondensed gas or vapors, which latter are mainly comprised of carbon monoxide, and possibly methyl-ether, and some unconverted methyl alcohol. These uncondensed gases we proposed, in our prior application, to remove in any suitable manner, preferably in a continuous process by allowing them to expand through a suitable expansion valve until atmospheric or other desired pressure is attained. We further stated that if desired instead of reducing the pressure of the uncondensed gases said gases might be mixed with a predetermined amount of steam and then passed through a second catalyst tube containing a suitable catalytic agent, such as alumina. The passage through the second catalyst tube causes any free methyl-ether which may be present to react with the water vapor and regenerate methyl alcohol as a vapor, which is later condensed after the gases leave the second catalyst tube, by any well known method of condensation. Methyl alcohol which is thus regenerated, we have stated, may be used in the process, if desired. The liquid which is condensed and trapped out after passing over the first catalyst contains, as above described, the acetic acid which, if desired, may be concentrated by any standard process of distillation. We also stated that as one example of a catalyst that has been found effective in the formation of acetic acid, we might mention the use of syrupy phosphoric acid, although any other equivalent, preferably a dehydrating catalyst, might be employed and we stated that the catalyst is preferably preheated to a temperature a little over that at which it is to be used in the catalyst tube, and desirably exposed to the reacting gases over as large a surface as possible in order that a maximum of catalytic action be obtained when the gases pass through the catalyst tube. We also specified in said application a practical manner of attaining this last desirable result, and discussed the range of temperatures at which the reaction might be preferably carried out. We also disclosed the fact that we had found that a mixture of carbon monoxide and carbon dioxide, instead of carbon monoxide alone, tends to reduce the formation of the carbon in the catalyst tube by providing an over sufficiency of carbon monoxide, that is, the carbon dioxide provided tends to combine with any free carbon that may be present to yield carbon monoxide according to the chemical equation:

$$CO_2 + C = 2CO$$

In carrying out our work further on the production of acetic acid from methanol by this method of synthesis we have now found that aqueous solutions of methyl alcohol and mixtures of water vapor and methyl alcohol vapor react as well as the concentrated methanol when in combination with carbon monoxide in the presence of a proper catalyst, such as syrupy phosphoric acid or the like. The catalyst to present a maximum catalytic action should preferably be spread out upon a chemically inert solid substance, such as silica gel and/or charcoal or the like. The operation just mentioned is also to be carried out at a pressure usually about 250 atmospheres although pressures ranging from 50 to 400 atmospheres can similarly be successfully used without departing from the scope of the invention, and at a temperature between 100° C. to 600° C. We have found further that the methyl-ether, which is formed in the reaction as a by-product, and which we stated to be possible of recovery as methanol, might be recovered as diluted methanol, as an active agent, and, further, that the water vapor or dilute methanol might be introduced into the chamber proper. We are not sure whether further chemical action or reaction is produced by the presence of the water element of the aqueous methanol solution, or by the presence of water vapor in said aqueous solution, or in the vapor of methyl alcohol, or by mixtures of water vapor and methyl alcohol or its vapors. However, we have found that acetic acid may be produced thereby as readily as that attainable from the use of concentrated or dilute methanol. Consequently, according to our present invention, we have provided a new, simple, inexpensive and efficient method of producing acetic acid synthetically. In other words, we have discovered that the concentrated methanol heretofore employed may be replaced, in the manufacture of acetic acid, by diluted or water diluted methanol and that the same desirable results are obtainable. While it is possible that it is the methyl alcohol content of the aqueous solution which performs the major portion of the useful work in the chemical reaction, yet we have discovered that the presence in the chemical reaction of the water diluent yields a most desirable quantity of acetic acid, of a desirable quality, and in a quick and very cheap way. We have found that the results obtainable with the use of the diluted product enables us to more efficiently effect the mixture of the methyl alcohol element with the carbon monoxide or the aqueous vapor mixture, inasmuch as the diluted methyl alcohol is more prone to combine, under some conditions, with the carbon monoxide gas than is the concentrated liquid methyl alcohol with the same carbon monoxide gas.

While we have mentioned the use of carbon monoxide and carbon dioxide gases as suitable for carrying out our present invention, it is to be understood that gaseous mixtures containing such gases may likewise be employed with good results. We have also discovered that by predeterminedly varying the proportions of aqueous and methyl alcohol vapors we are able to preserve and prolong the life of the catalytic agent used.

We have further discovered that the conversion of an alcohol to the next higher acetic acid in the same chemical series in accordance with our invention, may be greatly simplified and rendered more efficient and economical, by returning or recirculating to the action of the catalyst the unconverted and unreacted gases and vapors without permitting the expansion of such gases or vapors, or release of the pressure thereon. This results in a more complete conversion of the alcohol and eliminates entirely the production of by-products such as methyl-ether, and obviates any necessity of converting that by-product into methyl alcohol for use over again in the process. This also makes it unnecessary to handle, recover or recompress large volumes of gas, as has been necessary heretofore. Any condensed acid produced may be trapped or drawn off from time to time, without interrupting the circulation and recirculation of the reacting gases or vapors. In order to maintain the proper ratio of the reacting agents the condensed acid drawn off from time to time should be replaced in the circulating system by fresh supplies of mixtures of aliphatic alcohol and water, or of the vapors thereof, and carbon monoxide gas.

It is to be understood that the following claims are intended to cover all of the generic and specific features of the invention herein described.

What we claim for United States Letters Patent is:

1. The process of forming acetic acid which consists of mixing methyl alcohol vapor, aqueous vapor and carbon monoxide under pressure and at a sufficiently high temperature to prevent condensation of said alcohol vapor, passing said mixture over a heated dehydrating catalyst and thereafter condensing the acetic acid out of the gaseous mixture, and without reducing pressure mixing with the uncondensed gaseous mixture a quantity of steam and passing said steam mixture over a methanol catalyst.

2. The process recited in claim 1 characterized in that methyl alcohol vapor is mixed with the carbon monoxide while the mixture which is condensed is removed and concentrated to yield concentrated acetic acid, and the methyl alcohol which is regenerated is diluted and reused in the process.

3. The process of forming acetic acid which consists in combining dilute methyl alcohol vapor, aqueous vapor, and carbon monoxide gas under pressure and at a sufficiently high temperature to prevent condensation of said alcohol vapor, passing said mixture over a catalyst of syrupy phosphoric acid spread upon silica gel, thereafter condensing the gaseous mixture forming acetic acid, removing the portion of the gaseous mixture which is condensed and concentrating it to yield concentrated acetic acid, maintaining pressure and mixing with the uncondensed mixture a quantity of steam, and passing said mixture of gases and steam through a second catalyst tube to remove free methyl-ether therefrom.

4. The process of manufacturing acetic acid from dilute methanol which includes mixing dilute methanol vapor with aqueous vapor and a gas containing carbon monoxide and carbon dioxide and passing the portions of said mixtures over syrupy phosphoric acid and condensing out acetic acid and passing the remaining mixture over alumina in succession.

5. The process of forming acetic acid in accordance with claim 4 characterized in that the mixture is passed over the syrupy phosphoric acid and a part of the reaction product is passed over the alumina.

6. The process of producing acetic acid from methanol which consists in forming a mixture of methyl alcohol vapor, aqueous vapor and carbon monoxide gas, passing said mixture under pressure over a dehydrating catalyst, condensing out the acetic acid thereby formed, concentrating the acetic acid, converting into methanol any methyl-ether which may be present in the residual gases after condensing out the acetic acid therefrom, by mixing said methyl-ether with steam, passing the resulting mixture over a methanol catalyst, and then condensing out the methanol and diluting the same for re-circulation through the system.

7. The process of producing acetic acid from methanol which consists in forming a mixture of dilute methyl alcohol vapor, aqueous vapor and carbon monoxide gas passing said mixture under pressure over a heated catalyst consisting of syrupy phosporic acid, condensing out from the resulting mixture the acetic acid formed, converting into methanol any methyl-ether which may be present in the residual gases after removal of the acetic acid, by mixing said methyl-ether with steam, passing said mixture over a methanol catalyst, consisting of alumina, removing the resulting methanol and diluting it for recirculation through the system.

JOSEPH C. CARLIN.
NORMAN W. KRASE.